United States Patent [19]
Carballo

[11] Patent Number: 5,271,085
[45] Date of Patent: Dec. 14, 1993

[54] TEMPERATURE-CONTROLLED LABORATORY BEAKER COMPRISING A HEATING ELEMENT AND TEMPERATURE SENSOR BONDED TO THE OUTER SURFACE OF THE BEAKER BY A SILICONE-RUBBER MOLDING

[76] Inventor: Rodolfo A. Carballo, 4500 East Speedway, Business Park No. 84, Tucson, Ariz. 85712

[21] Appl. No.: 838,034

[22] Filed: Feb. 20, 1992

[51] Int. Cl.⁵ .......................... H05B 1/02; H05B 3/00; A47G 19/00
[52] U.S. Cl. .................................... 392/444; 219/436; 219/438; 219/442; 219/535; 392/458
[58] Field of Search ............... 392/444, 458, 459, 480; 219/436, 438, 441, 442, 535, 543, 549

[56] References Cited

U.S. PATENT DOCUMENTS

| | | | |
|---|---|---|---|
| 995,434 | 6/1911 | Bolling | 219/436 X |
| 2,491,266 | 12/1949 | Hooper | 219/535 X |
| 2,689,904 | 9/1954 | Melton | 219/535 X |
| 2,883,307 | 4/1959 | Orr | 219/438 X |
| 3,092,704 | 6/1963 | De Woody et al. | 219/436 X |
| 3,331,946 | 7/1967 | Bilbro | 392/480 X |
| 3,456,096 | 7/1969 | Bilbro | 392/480 X |
| 3,678,247 | 7/1972 | Sawa et al. | 219/501 |
| 3,780,263 | 12/1973 | Kuzyk | 219/501 |
| 3,806,701 | 4/1974 | Scott | 219/436 X |
| 4,912,303 | 3/1990 | Beavers et al. | 219/535 |
| 4,935,602 | 6/1990 | Bravo | 392/458 |

FOREIGN PATENT DOCUMENTS

| | | | |
|---|---|---|---|
| 364452 | 11/1922 | Fed. Rep. of Germany | 219/535 |
| 2417233 | 10/1979 | France | 219/549 |
| 2421529 | 11/1979 | France | 219/535 |
| 287828 | 3/1928 | United Kingdom | 219/535 |
| 1599759 | 10/1978 | United Kingdom | 219/535 |

OTHER PUBLICATIONS

"Thermofoil Heater Kit", Bulletin TF-2, Model HK-913 Minco Products Inc. Minneapolis, Minn.

Primary Examiner—Anthony Bartis
Attorney, Agent, or Firm—Antonio R. Durando; Harry M. Weiss

[57] ABSTRACT

A temperature-controlled laboratory heating apparatus consisting of a flexible electrical heater wrapped around the exterior surface of a conventional glass or metal beaker and permanently encased within a rubber molding forming an insulating ring around it. The heater is electrically connected to a power source through an integrated-circuit temperature control panel. A thermistor is mounted against the outside surface of the beaker within the rubber molding and is connected to the control panel to regulate the flow of current through the electrical heater to reach and maintain the temperature set by the user. In one embodiment of the invention, the current through the heater is automatically regulated to optimize the time required to heat the liquid in the beaker to the desired temperature and to then deliver trickle currents, as needed, to minimize fluctuations from the set-point.

7 Claims, 1 Drawing Sheet

TEMPERATURE-CONTROLLED LABORATORY BEAKER COMPRISING A HEATING ELEMENT AND TEMPERATURE SENSOR BONDED TO THE OUTER SURFACE OF THE BEAKER BY A SILICONE-RUBBER MOLDING

BACKGROUND OF THE INVENTION

1. Field of the Invention

This invention is related to the general field of chemical laboratory equipment. In particular, the invention provides a new apparatus, consisting of a beaker heated by a temperature-controlled thermoelectric unit, for use in temperature-sensitive chemical reactions, such as in electroplating of small items like as jewels and lapidary works.

2. Description of the Prior Art

Chemical laboratories require constant-temperature environments for performing experiments under controlled conditions. After reactants are heated to the desired experiment temperature for a given process, it is often critical that the temperature be maintained constant for the duration of the experiment in order to produce meaningful results. Similarly, constant-temperature apparatus is essential for certain types of electrochemical reactions carried out in small production laboratories, such as in the electroplating of jewels and other works. While this disclosure is not intended to be directed only to electroplating, this process will be used for the purposes of describing the invention and illustrating its usefulness.

Electroplating has for its object the deposition of a layer of metal on another metal or nonmetal (such as glass, porcelain, plastic) for the purpose of ornamentation, corrosion protection, building up of worn parts, improving wear resistance, improving light reflectance, or otherwise changing the physical or chemical properties of surfaces. All electroplating on a commercial scale is done in aqueous solutions; the object to be plated is made the cathode, or negative electrode, immersed in a solution containing ions of the metal to be plated. In nearly all cases, the anode or positive electrode, also immersed in the same solution, is made of the same metal as that being deposited on the cathode. As direct current flows between the electrodes, the anodic metal goes into solution electrolytically and replaces the metal ions deposited on the cathode, thus maintaining the metal content of the plating solution. Thus, theoretically the solution should suffer no change in composition with use. In practice, though, there are changes that occur as a function of variables such as the type of metal being deposited and the operating conditions, temperature being one of the most significant of such variables. Therefore, control of the temperature of the electroplating bath is an important feature of electroplating apparatus.

Electroplating performed by jewelers and other small-artifact artisans is normally carried out in rather unsophisticated fashion by heating the electroplating solution to the desired temperature in a conventional beaker over a hot plate. For example, gold plating is typically performed from a gold cyanide solution at 60° to 82° C. The two electrodes are then immersed in the solution and energized by a D.C. voltage source for the required period of time to achieve the desired level of deposition, while the temperature is maintained approximately constant by alternatively switching the hot plate on and off during the electroplating operation.

Obviously, the process of conducting electroplating by immersing and manipulating the object of interest in a beaker sitting on a hot plate, while controlling the bath temperature by turning the plate on and off, is cumbersome, inefficient and impractical. Moreover, since the heat source at the bottom of the beaker, a vertical temperature gradient is created within the solution which may affect the quality of electroplating. Therefore, there exists a need for a simple, temperature-controlled, electroplating container that automatically maintains the plating solution's temperature at the desired set-point.

BRIEF SUMMARY OF THE INVENTION

One objective of this invention is the development of a temperature-controlled beaker for laboratory testing and small production use.

Another objective of the invention is a self-contained device that can be used as stand-alone equipment, rather than in conjunction with a separate heater.

Another goal of the invention is a beaker wherein the reactants solution is automatically maintained at a constant temperature during the reaction.

A further goal of the invention is that it be suitable for use in any application requiring a constant-temperature liquid environment, such as for electroplating small items of jewelry and lapidary works.

A final objective is the easy and economical manufacture of the invention according to the above stated criteria. This is achieved by using commercially available components and materials in a novel combination and with structural modifications designed to increase the efficiency of the invention.

According to these and other objectives, the present invention consists of a flexible electrical heater wrapped around the exterior surface of a conventional glass or metal beaker and permanently encased within a rubber molding forming an insulating ring around it. The heater is electrically connected to a power source through an integrated circuit control panel. A thermistor is mounted against the outside surface of the beaker within the rubber molding and is connected to the control panel to regulate the flow of current through the electrical heater to reach and maintain the temperature set by the user. In one embodiment of the invention, the current through the heater is automatically regulated to minimize the time required to heat the liquid in the beaker to the desired temperature and to then deliver trickle currents, as needed, to avoid wide fluctuations from the set-point.

Various other purposes and advantages of the invention will become clear from its description in the specifications that follow and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

The heart of this invention lies in the combination of an electric heater and temperature controller with a conventional beaker to produce a simple, self-contained, device for maintaining a solution at a constant process temperature, such as is required for electroplating small objects. The heater is wrapped around the wall of the beaker to provide a large surface for heat exchange, so that heat transfer with the liquid in the beaker is maximized and the temperature gradient within the liquid is reduced.

Figure 1:
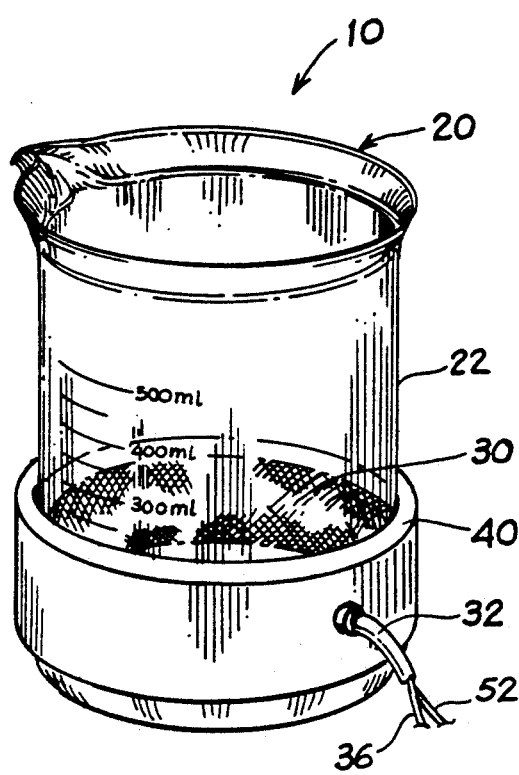
FIG. 1 is a perspective view of the electric heater/beaker combination according to one embodiment of this invention.

Referring to the drawings, wherein like parts are referenced throughout with like numerals and symbols, FIG. 1 shows a perspective view of one embodiment of the heated-beaker device 10 of the invention. The device comprises a conventional cylindrical beaker 20 (illustrated in glass) combined with an electric heater 30 wrapped around the external surface of the beaker's wall 22 (seen in the figure through the beaker's transparent wall). Although the beaker 20 is illustrated in the figures as glass, any other kind of thermally conductive material, such as stainless steel or other metal, would be equivalently suitable to practice the invention. The heater 30 consists of electric tape, or equivalent heating means, directly in contact with the beaker's wall, so that heat transfer between the heating elements in the tape and the liquid in the beaker is optimal. The heater 30 is placed near the bottom of the beaker and the heater's height is chosen to approximately match the expected level of the solution in the beaker during use, so that the heating efficiency of the device is maximized. It is important that the level of the solution in the beaker be maintained above the heater in order to avoid the formation of potentially dangerous hot spots in the wall of the beaker during use. Obviously, although not fully seen in the figures, the heater is placed around the entire circumference of the beaker to provide maximum heating surface, with the only exception of the space between the two ends 38 of the heater (seen in FIG. 2), which is left open to provide room for a temperature sensor 50, such as a thermistor control element, as detailed below.

In the preferred embodiment of the invention, standard flexible heaters manufactured by Watlow Electric Manufacturing Company of St. Louis, Mo., and by Minco Products, Inc. of Minneapolis, Minn., were used. It is found that 50 and 100 Watt heaters are available in 1" by 10" and 2" by 10" flexible strips, respectively, which are very suitable for standard 600 ml beakers. Similarly, 200 Watt heaters are available in 4" by 12" strips, suitable for 1,000 ml beakers.

A molding 40, preferably made with silicone rubber or equivalent resilient and insulating material, is formed around the heater 30 to permanently encase it in place. An electrical wire sleeve 32 containing the wiring 36, connecting the heater to a separate electric power source (not shown in FIGS. 1 and 2), and the wiring 52, connecting the temperature sensor to a temperature control circuit (also not shown in FIGS. 1 and 2), is also encased in the molding 40. The thermal-insulating characteristics of the molding ensure that no heat is lost directly from the heater to the environment surrounding the beaker.

Figure 2:
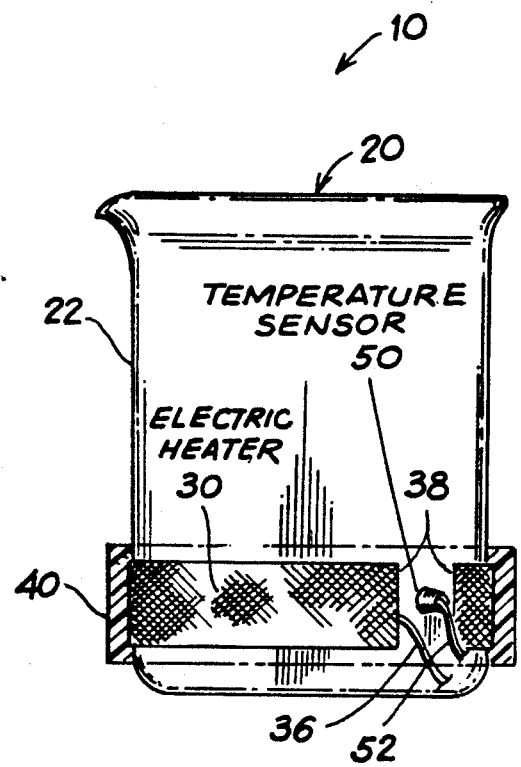
FIG. 2 is an elevational view of the heater/beaker combination of FIG. 1 showing a cross-section of the molding around the beaker to illustrate the structural composition of the electric heater and thermistor encased in it.

FIG. 2 is an elevational view of the heated-beaker device 10 illustrating the way the heater 30 is wrapped around the beaker within the molding 40. As mentioned above, an open space is left between the ends 38 of the heater, so that a thermocouple 50, or an equivalent device, may be attached to the outside surface of the beaker without being in contact with and interfered by the heater. The heater wires 36 and the thermocouple wires 52 constitute the wiring contained in the sleeve 32 protruding out of the molding 40. The molding is formed around the heater and thermocouple by using a donut-shaped mold clamped around the beaker, which is filled with any of the many known molding materials. For example, it is found that liquid silicone molding rubber, such as the product sold by the Dow Corning Corporation of Midland, Mich., under the trademark "RTV", is suitable for forming the molding 40 through a high temperature process. The heater 30 and the temperature sensor 50 are glued, taped, or otherwise affixed to the outer wall 22 of the beaker at the desired elevation within the height of the beaker and the donut-shaped mold is mounted around them. Of course, the mold must feature a peripheral opening for housing the sleeve 32 containing wires 36 and 52 within the cavity of the mold. This cavity is then filled with liquid rubber through appropriate perforations in the mold, as one skilled in the art would know, and the mold is left to cure at approximately 120° F. for 30 minutes. Thus, the rubber surrounds and incorporates the heater and thermocouple, and it forms a permanent enclosure around them that locks them in place and ensures their direct contact with the surface of the beaker.

Other, equivalent, processes may be used to form the molding 40. One method, for example, that utilizes silicone rubber sold by the Castaldo Company of Franklin, Massachusetts, is carried out at room temperature. The rubber, which is available in solid strips, is wrapped around the heater and fluidized by the pressure to which it is subjected when the mold is clamped around it, thus filling all the space in the mold's cavity. After a period of at least eight hours, the rubber is cured in place and the mold may be removed.

Figure 3:
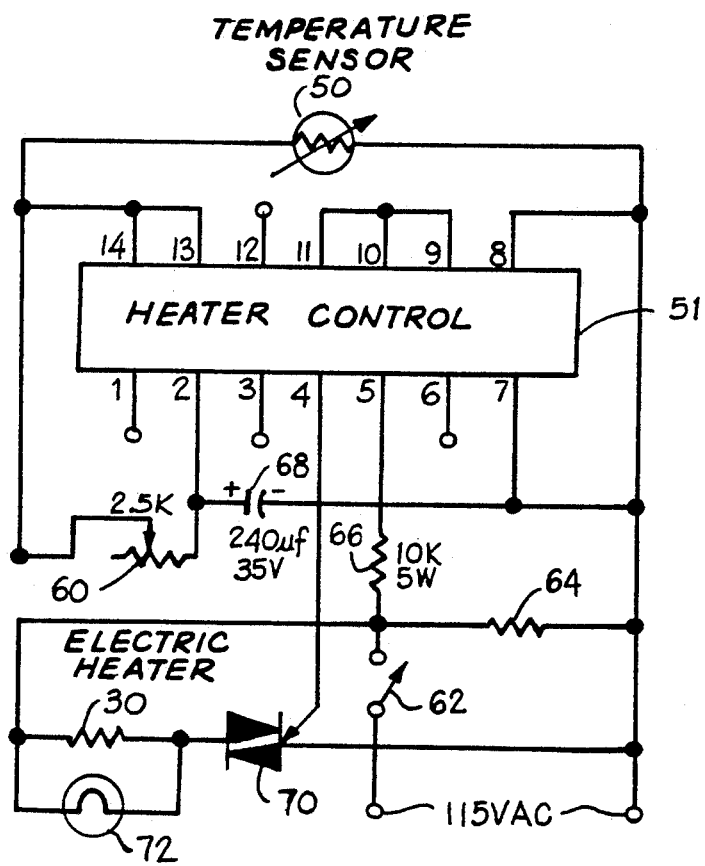
FIG. 3 is a schematic diagram of a typical electrical circuit used with the thermoelectric apparatus of this invention.

The invention is automated by connecting the heater wires 36 to a power source that is activated by a temperature controller connected to the temperature sensor 50 through wires 52. The implementation of this kind of temperature control is old in the art and could be effected in many different ways. FIG. 3 is a schematic representation of the devices and circuitry used in the preferred embodiment. Using a 14-pin integrated-circuit controller device 51, such as manufactured by the Motorola Company of Tempe, Ariz., and National Semiconductor Corporation of Santa Clara, Calif., under the part number CA3059, the temperature control is implemented by connecting the device 51 to a rheostat 60 in series with a thermistor 50 (a temperature variable resistor). The use of a thermistor instead of a conventional thermocouple makes it possible to effect the control function by comparing the voltage across the thermistor (which varies with temperature) with the voltage across the rheostat, which of course varies according to its setting. The heater 30 is connected to a triac device 70 that is controlled by the integrated circuit 51 as a function of the setting of the rheostat 60 and of the temperature of the thermistor 50. The integrated circuit includes comparator circuitry to compare the voltages across the two components and to activate the triac device when the temperature sensed by the thermistor is below the setting of the rheostat, thus permitting the flow of current through the heater and a parallel heater indicator light 72. The circuit is powered by a 115 VAC utility source through a switch 62. When the switch is closed, a power indicator light 64 is turned on and the integrated circuit 51 is energized through a voltage step-down resistor 66. A capacitance 68 is provided to filter the rectified DC signal produced by the integrated circuit.

As a result of this electronic configuration, the temperature controller of the invention is turned off automatically if the thermistor fails in any way. Because of their sensitivity, thermistors provide an excellent feedback signal that permits temperature control to within plus or minus one degree Fahrenheit.

In operation, the present invention is used by setting the rheostat (which may be calibrated to corresponding temperatures) to the desired set-point. If the temperature of the solution in the beaker, which should be contemporaneously monitored for precision by a separate thermometer immersed in the solution, is lower than the setting, the heater is energized and the solution is heated. As the temperature approaches the set-point and the voltage across the thermistor approaches the voltage across the rheostat, the triac progressively trims the power delivered to the heater until it is completely turned off at the set-point. At that point the solution in the beaker is ready for electroplating or any other use that requires constant temperature. As the solution's temperature begins to fall, the voltage at the gate of the triac reflects that change and current begins to flow again through the heater to reestablish the set-point. Thus, this simple design guarantees automatic control of the temperature to the desired set-point.

Many equivalent embodiments of the invention are anticipated for commercial purposes. For example, multiple color-coded beakers may be combined with a single power source in a control unit containing multiple independent temperature control circuits, so that various experiments may be conducted in parallel with little risk of confusion. For instance, beakers with red and blue moldings may be used for acid and basic environments, respectively. A high-precision thermometer may also be provided with the apparatus, as a separate instrument, for use in monitoring the functioning of the temperature controller while conducting highly sensitive processes.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein, but is to be accorded the full scope of the claims so as to embrace any and all equivalent apparatus and methods.

I claim:

1. An apparatus for heating a liquid to a set-point temperature and for automatically maintaining that temperature, comprising:

(a) a beaker made of thermally conductive material;
   (b) an electric heater wrapped around and affixed to the outside wall of said beaker;
   (c) electrical means for energizing said electric heater;
   (d) temperature sensing means in contact with and thermally coupled to the outer surface of said beaker for developing a signal corresponding to the temperature of the beaker;
   (e) electronic means connected to said temperature sensing means for receiving a signal therefrom indicative of the temperature of the beaker and including means for comparing the signal so received to a set-point temperature corresponding to a temperature chosen by a user and for activating said electrical means for energizing said electric heater when the temperature corresponding to the signal is below the set-point temperature; and
   (f) a molding bonded to the outer surface of said beaker and formed around said electric heater and said temperature sensing means, wherein said molding completely covers the electric heater and the temperature sensing means and permanently bonds the heater and the temperature sensing means to the outer surface of the beaker;
   wherein said electronic means for comparing the signal developed by said temperature sensing means to a set-point temperature and for activating said electrical means for energizing said electric heater consists of an integrated circuit comparator connected to said temperature sensing means, to a rheostat for adjusting the set-point temperature, and to a triac device serving as a switch in said electrical means for controlling the current flow through said electric heater.

2. The apparatus described in claim 1, wherein said temperature sensing means consists of a thermistor.

3. The apparatus described in claim 1, wherein said heater consists of a flexible electrical heater permanently attached to the exterior wall near the bottom of said beaker and the heater's height is chosen to approximately match the expected level of the liquid in the beaker during use.

4. The apparatus described in claim 1, wherein said molding consists of silicone rubber.

5. A method of manufacturing an apparatus for heating a liquid to a set-point temperature and for automatically maintaining that temperature, comprising the following steps:

(a) providing a beaker made of thermally conductive material;
   (b) wrapping an electric heater around the outside wall of said beaker;
   (c) providing a thermistor thermally coupled to and in contact with the outer surface of said beaker for developing a signal corresponding to the temperature of the liquid in the beaker;
   (d) forming a molding around and completely enclosing said electric heater and said thermistor;
   (e) providing a source of electric energy connected to said electric heater; and
   (f) providing electronic means for comparing the signal developed by said thermistor to a set-point temperature corresponding to a temperature chosen by a user and for energizing said electric heater in response to a temperature corresponding to the signal being below the set-point temperature;

wherein said electronic means consists of an integrated circuit comparator connected to said thermistor and to a rheostat for adjusting the set-point temperature, and actuating a triac device serving as a switch for controlling the current flow through said electric heater;

wherein said heater consists of a flexible electrical heater permanently attached to the exterior wall near the bottom of said beaker and the heater's height is chosen to approximately match the expected level of the liquid in the beaker during use; and wherein said molding consists of silicone rubber.

6. The method described in claim 5, wherein said step of forming a molding around said electric heater and said temperature sensing means is accomplished by providing a donut-shaped mold clamped around the beaker with a cavity surrounding the heater and temperature sensing means, by filling the cavity with liquid silicone rubber, and by letting it cure at 120° F. for approximately 30 minutes.

7. The method described in claim 5, wherein said step of forming a molding around said electric heater and said temperature sensing means is accomplished by providing a donut-shaped mold clamped around the beaker with a cavity surrounding the heater and temperature sensing means, by filling the cavity with solid silicone rubber, and by fluidizing it by the pressure to which it is subjected when the mold is clamped around it, and by allowing it to cure for at least eight hours at room temperature.

* * * * *